United States Patent

[11] 3,585,749

| [72] | Inventor | Edward R. Dieckmann<br>5458 Kenridge Drive, Blue Ash, Ohio 45242 |
|---|---|---|
| [21] | Appl. No. | 838,394 |
| [22] | Filed | July 2, 1969 |
| [45] | Patented | June 22, 1971 |

[54] FLEXIBLE FISHING LURE
8 Claims, 4 Drawing Figs.

[52] U.S. Cl. ..................................................... 43/42.03, 43/42.06
[51] Int. Cl. ..................................................... A01k 85/00
[50] Field of Search .......................................... 43/42.03, 42.06, 42.24

[56] References Cited
UNITED STATES PATENTS

| 1,393,617 | 10/1921 | Frame | 43/42.06 X |
| 2,028,050 | 1/1936 | De Witt | 43/42.06 |
| 2,600,437 | 6/1952 | Siepe | 43/42.06 X |
| 2,736,124 | 2/1956 | Wittmann, Jr. | 43/42.06 X |
| 2,797,518 | 7/1957 | Anderson | 43/42.06 |

Primary Examiner—Warner H. Camp
Attorney—Melville, Strasser, Forster & Hoffman

ABSTRACT: Water is forced through side-by-side chambers within the body of a flexible fishing lure as the lure is drawn through the water. The relative volume of water flowing through the chambers is varied by a deflector valve opening alternately into the chambers for deflecting water from one chamber into the other. The chambers have corresponding jet discharge outlets opening to the outside of the chambers in the tail portion of the lure, and the variations in the relative velocities and volumes of water flowing from the discharge outlets causes reactionary alternative side-to-side bending movement of the tail portion. The chambers may also be provided with pockets of water absorbent material for increasing the weight of the lure before casting for easier casting and sinking upon striking the water.

PATENTED JUN 22 1971 3,585,749

INVENTOR/S
EDWARD R. DIECKMANN

BY *Melville, Strasser, Foster and Hoffman*
ATTORNEYS 3,585,749

FLEXIBLE FISHING LURE

BACKGROUND OF THE INVENTION

Since the dawn of the history of mankind men have engaged in the piscatorial sport and much time and effort have been devoted to devising methods and devices for luring fish and other aquatic life into position whereby they may either be trapped or netted or induced to bite over hooks attached to lines so the fish may be caught and pulled from the water. This invention is primarily for sport fishing purposes as it has the appearance of live bait and is flexible and provides for side-to-side movement of the tail portion thereof as it is drawn through the water thus giving the appearance of a real fish or other type of bait so as to induce game fish to strike at it and thus become impaled on hooks suspended therefrom. Various devices have been developed in endeavors to induce fish to strike at them by making lures which simulate the appearance of live bait and, with more particular reference to this invention, lures which wiggle and move through the water in a lifelike fashion calculated to deceive fish into the belief that the lure is a live bait. It is the object of this invention to provide a novel fishing lure which is lifelike in appearance and in movement as drawn through the water.

SUMMARY OF THE INVENTION

Briefly considered, this invention contemplates a flexible fishing lure having a chamber in each side of the body, each said chamber having a front intake opening and an outwardly opening rearward jet discharge outlet so that water flows through said chambers as the lure is drawn through the water. A deflector valve pivotally mounted in the partition separating said chambers is alternately movable into and between said chambers so as to divert water from one chamber into the other and thus increase the volume and velocity of the water flowing out of the discharge outlet in one of the chambers relative to that flowing out of the outlet in the other chamber, causing a reactionary bending sideward movement of the tail portion of the lure. This bending movement urges the valve into the other chamber diverting water into the chamber formerly occupied by the valve, thus increasing the volume and velocity of water flowing through this chamber and causing reactionary bending movement of the tail portion to the other side. The valve thus moves back and forth between the chambers and the resultant alternate changes in the relative volume and velocity of the water flowing out of the discharge outlets imparts a realistic lifelike tail-flipping movement to the lure as it is drawn through the water.

PREFERRED EMBODIMENT OF THE INVENTION

Figure 1:
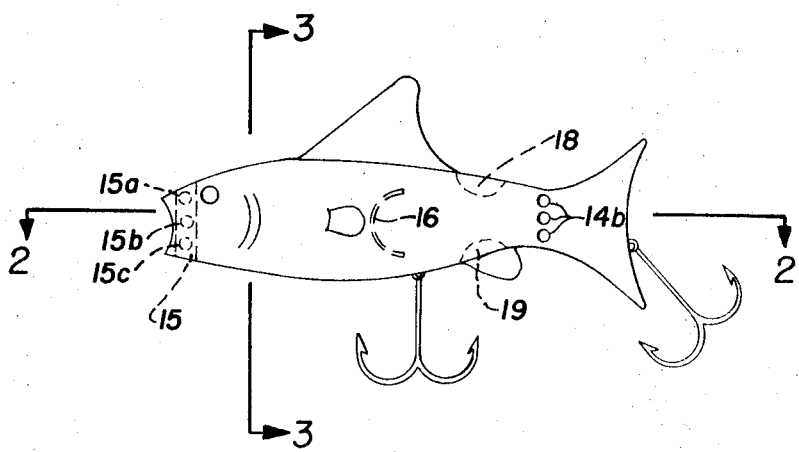
FIG. 1 is a side elevational view of a fishing lure according to this invention.
Figure 2:
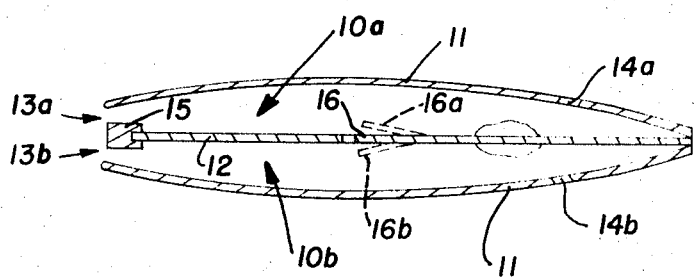
FIG. 2 is a top sectional view taken along the lines 2-2 of FIG. 1.
Figure 3:
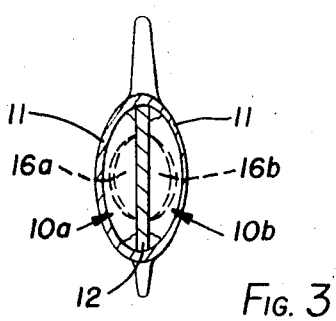
FIG. 3 is a front sectional view taken along lines 3-3 of FIG. 1.

As seen in FIG. 1, the body of the lure will be decorated to resemble a fish but it could be shaped and decorated to look like other forms of aquatic life fish consider food. As best seen in FIGS. 2 and 3, the body comprises two substantially bilaterally symmetrical chambers 10a and 10b, the outer body shell 11 being constructed of flexible material, preferably plastic, and the chambers are divided by a partition 12, preferably of semiflexible plastic material more rigid than the body shell 11. The chambers 10a and 10b open at the front through openings 13a and 13b respectively and open outwardly at the rear through openings 14a and 14b, respectively. A rigid vertical member 15 is mounted just within the mouth of the lure having vertically spaced openings 15a, 15b and 15c for attachment of a leader and hook-holding means to the lure.

As the lure is drawn through the water, water enters openings 13a and 13b and flows back through the chambers and discharges outwardly through jet discharge outlets 14a and 14b.

Pivotally mounted in partition 12 forward of discharge outlets 14a and 14b is a deflector valve 16 which is preferably a flap formed in and remaining attached as an integral part of partition 12. This valve 16 is pivotally movable into and between chambers 10a and 10b, and it has three general positions, position 16a wherein it is opened into chamber 10a, position 16b wherein it is opened into chamber 10b, and an inactive or neutral position wherein it is aligned with partition 12.

As previously mentioned, the leader will be attached to the lure at one of the openings in vertical member 15. Thus when the lure is cast into the water and the line is reeled in, the lure will be drawn through the water mouth first and water will be taken into the chambers 10a and 10b through openings 13a and 13b and will be forced from the rear of the chambers in outsidewardly directions through discharge outlets 14a and 14b. In practice, as the lure is cast, it will land on one side or another or at least in a horizontally inclined plane so that valve 16 will be urged to move into either position 16a or 16b. Thus, assuming the valve opens into position 16a upon being cast, as the lure is drawn through the water some of the water moving through chamber 10a will be diverted into chamber 10b, and this will increase the volume and velocity of water flowing out of discharge outlet 14b relative to the volume and velocity of water flowing from outlet 14a, which will result in a reactionary bending movement of the entire tail portion of the lure to the right or chamber 10a side thereof. The bending of the rearward portion of partition 12 will, since in the preferred embodiment deflector valve 16 in an integral part of partition 12, urge the shutter valve 16 toward its neutral position and through said position into position 16b wherein it is opened into chamber 10b. When valve 16 is in position 16b, some of the water flowing through chamber 10b will be diverted into chamber 10a, which will increase the volume and velocity of water flowing from outlet 14a relative to the volume and velocity of water flowing from outlet 14b. This will result in reactionary bending movement of the entire tail portion of the lure toward the left or chamber 10b side thereof. The bending movement of partition 12 to the left will urge deflector valve 16 to and through its neutral position to its position 16a wherein it is again opened into chamber 10a, thus beginning the entire cycle again. The alternative side-to-side bending movement of the tail portion of the lure will thus continue as long as the lure is drawn through the water and imparts a very lifelike appearance to the lure.

Figure 4:
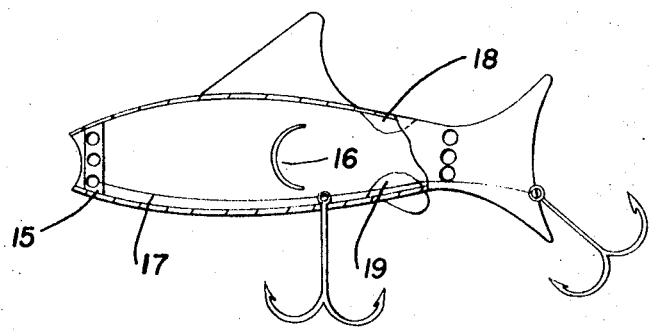
FIG. 4 is a partially cutaway side elevational view.

As best shown in FIG. 4, a strong leader or cable secured to vertical member 15 extends through the body portion to the tail of the lure and has a hook or hooks secured thereto and extending outside of the lure at any desired intervals.

As previously mentioned, vertical member 15 is provided with a plurality of vertically spaced openings 15a, 15b and 15c, for securing a leader to the lure. If the leader is secured to the lower opening 15c, the lure will incline upwardly as it is drawn and will tend to travel near or at the surface of the water. Conversely, if the leader is secured to the upper opening 15a, the lure will be inclined downwardly and will tend to travel well beneath the surface, and if the leader is secured to opening 15b, i.e. approximately in the middle of vertical member 15, the lure will tend to travel parallel to the surface of the water and just beneath the surface.

Inasmuch as lures according to this invention must of necessity be rather light in weight to have the desired degree of flexibility, particularly in the rearward portion thereof which must be flexible for transverse bending movement, upper and lower pockets 18 and 19 are provided forward of the discharge outlets 14a and 14b but rearward of the shutter valve 16. Preferably these pockets contain sponge or artificial sponge material so that before use the lure may be manually submerged in water and the sponge material will absorb sufficient water to give the lure sufficient weight for casting purposes and to insure that it will submerge immediately upon striking the water after being cast.

It will be apparent to one skilled in the art that various modifications and equivalents may be employed in practicing this invention. No limitations are to be inferred or implied except as specifically set forth in the claims.

The embodiments of the invention in which I claim an exclusive property or privilege are defined as follows:

1. A fishing lure comprising, in combination:
   a. a flexible elongated body portion simulating a minnow or the like, said body portion having a first chamber and a second chamber in substantial bilateral symmetry to said first chamber, said chambers being separated by a generally planar semiflexible partition and being provided with corresponding front water intake openings and corresponding outwardly opening water discharge outlets in the tail portion of said lure;
   b. means associated with said partition for alternately increasing and decreasing the volume and velocity of water discharging from said first chamber discharge outlet relative to the volume and velocity of water discharging from said second chamber discharge outlet; and
   c. hook means; whereby water is forced into and through said chambers from the front to the rear thereof and out of said discharge outlets as said lure is drawn through the water, and the alternate increases and decreases in the volume and velocity of water discharging from said first chamber discharge outlet relative to the volume and velocity of water discharging from said second chamber discharge outlet causes reactionary alternate side-to-side bending movement of the tail portion of said lure.

2. The fishing lure claimed in claim 1, wherein said means for alternately increasing and decreasing said water discharge volume and velocity comprises a deflector valve pivotally mounted in said partition forward of said discharge outlets for transverse alternative movement into and between said chambers, said valve having a first active position wherein it projects into said first chamber and a second active position wherein it projects into said second chamber.

3. The fishing lure claimed in claim 2, wherein said deflector valve comprises a flap formed from and remaining attached as an integral part of said partition.

4. The fishing lure claimed in claim 3, wherein the rearward portion of said deflector valve is attached to said partition along a line generally transverse to the longitudinal axis of said partition.

5. The fishing lure claimed in claim 2, including means actuated by said bending movement of said tail portion of said lure toward the first chamber side thereof to urge said valve into its second active position and by said bending movement of said tail portion toward the second chamber side of said lure to urge said valve into its first active position.

6. The fishing lure claimed in claim 1, including pockets of water absorbent material disposed between said means for alternately increasing and decreasing said water discharge volume and velocity and said water discharge outlets, whereby the weight of said lure may be increased by absorption of water by said material and said lure will be capable of being cast farther and more accurately and will sink immediately upon striking the water.

7. The fishing lure claimed in claim 1, including a vertically disposed rigid member positioned adjacent said front intake openings, said member having a plurality of vertically spaced means for attachment of a leader thereto, whereby the depth and attitude of said lure may be controlled as it is drawn through the water.

8. The fishing lure claimed in claim 7, including hook-holding means secured to said vertically disposed member.